Figure 1:
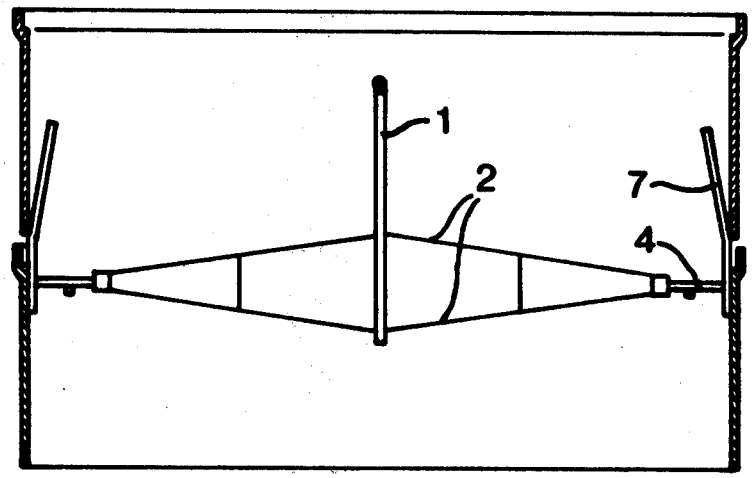

United States Patent [19]

Selden et al.

[11] 4,143,450
[45] Mar. 13, 1979

[54] APPARATUS FOR CENTERING AND JOINING CYLINDRICAL WOUND SECTIONS

[75] Inventors: Peter H. Selden; Wolfgang Albrecht, both of Ludwigshafen; Heinz Weissenmayer, Boehl-Iggelheim, all of Fed. Rep. of Germany

[73] Assignee: BASF Aktiengesellschaft, Ludwigshafen, Fed. Rep. of Germany

[21] Appl. No.: 868,534

[22] Filed: Jan. 11, 1978

[30] Foreign Application Priority Data

Jan. 29, 1977 [DE] Fed. Rep. of Germany ... 7702651[U]

[51] Int. Cl.² .............................................. B25B 27/14
[52] U.S. Cl. ..................................................... 29/272
[58] Field of Search .................. 29/271, 272, 234, 282

[56] References Cited

U.S. PATENT DOCUMENTS

| | | | |
|---|---|---|---|
| 1,515,785 | 11/1924 | McDonald | 29/272 |
| 2,615,413 | 10/1952 | Adams et al. | 29/271 |

FOREIGN PATENT DOCUMENTS 492297  2/1930  Fed. Rep. of Germany ............. 29/272

Primary Examiner—James L. Jones, Jr.
Attorney, Agent, or Firm—Keil & Witherspoon

[57] ABSTRACT

In an apparatus for centering and joining cylindrical wound sections, which are not dimensionally stable, of fiber-reinforced plastics, a plurality of struts which join a central tube to a profile ring are provided. The apparatus further comprises, arranged as an extension of the struts, levers which are detachably fastened to the profile ring by means of swivel joints, and guide rails. By replacing these levers, rapid refitting to deal with larger or smaller diameters of wound sections is achieved.

2 Claims, 2 Drawing Figures

APPARATUS FOR CENTERING AND JOINING CYLINDRICAL WOUND SECTIONS

The present invention relates to apparatus for centering and joining cylindrical would sections, which are not dimensionally stable, of fiber-reinforced plastics, which apparatus comprises a central tube, a profile ring and a plurality of struts which join the central tube to the profile ring.

The manufacture of cylindrical flat-bottomed tanks of large capacity from steel is known. Advances in the technology of fiber-reinforced plastics, especially of glass fiber-reinforced thermosetting resins, e.g. unsaturated polyester resins, nowadays also permit the manufacture of such flat-bottomed tanks from the said plastics. Though various constructions are possible, for example seamless production in one piece, or production from joined lengthwise segments, it is the manufacture of such tanks from cylindrical wound sections which is of the greatest importance. The wound sections are joined in the conventional manner, for example by flanges, socket joints or the use of cover straps. However, in all these cases it is necessary to ensure that each successive wound section is placed on the preceding section with complete circular alignment and precise axial positioning. This makes it necessary to use a crane or block-and-tackle or similar equipment. However, because of the relatively low modulus of elasticity of glass fiber-reinforced thermosetting resins as compared to steel, it is often not possible, even if the crane is operated very efficiently, to place the wound sections on or inside one another with the required precision unless additional guide devices are used. The conventional guide devices are furthermore of extremely complicated construction, require a great deal of labor and time for their operation, and are accordingly, all in all, uneconomical.

We have found an apparatus for centering and joining cylindrical wound sections, which are not dimensionally stable, which apparatus does not suffer from the above disadvantages. It consists of a central tube, a profile ring and a plurality of struts which join the central tube to the profile ring, and, according to the invention, there are provided, on the periphery of the profile ring, levers joined to one another by rods, which levers carry guide rails at their free ends and are detachably fastened to the profile ring by means of swivel joints.

The apparatus is distinguished by simplicity of construction and can be assembled or dismantled particularly easily within the wound section. Maintenance of the circular cross-section of each wound section is ensured at any time. A further advantage is that the apparatus can rapidly be adapted to suit larger or smaller wound section diameters, by replacing the levers which are detachably fastened to the profile ring.

The invention further provides that the levers can be swivelled by means of a common drive, which in particular makes it possible uniformly to clamp and slacken all the guide rails on the wound section.

Figure 2:
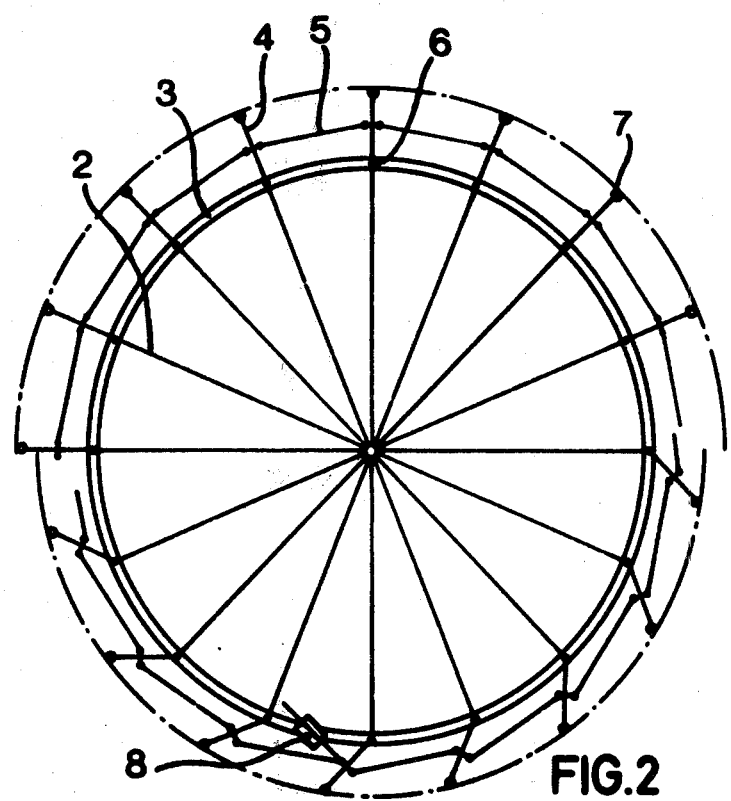

An illustrative embodiment of the device according to the invention is shown schematically in the accompanying drawing and explained in more detail below. In the drawing in FIG. 1 shows a side view and FIG. 2 a plan view, the apparatus being shown in the clamped state in the upper half and in the slackened state in the lower half.

The main part of the apparatus is a rigid frame construction which consists of a central tube 1, a profile ring 3 and a plurality of struts 2 which join the profile ring to the central tube. The number of the struts, which are in general manufactured from hollow profiles, depends on the diameter of the wound sections and is advantageously from 12 to 24.

A number of levers 4 corresponding to the number of struts 2 are provided, as extensions of the struts, on the profile ring 3. The levers are detachably fastened to the profile ring by means of swivel joints 6 and are joined to one another by rods 5. To permit swivelling movements of the levers 4, the rods 5 are provided with ball joints at both ends.

The guide rails which are welded onto the levers 4 and by means of which the device rests in the wound section, are marked 7. The levers and hence the guide rails are moved by means of a drive 8 fastened to the profile ring 3. An example of a suitable drive is a worm-drive self-locking thread, which acts via a linkage on one of the levers 4. All the levers can be moved simultaneously by actuating the threaded spindle.

The apparatus can rapidly be adapted to other wound section diameters by replacing the levers 4.

We claim:

1. Apparatus for centering and joining cylindrical wound sections, which are not dimensionally stable, of fiber-reinforced plastics, said apparatus comprising a central tube, a profile ring and a plurality of struts which join said central tube to said profile ring, and wherein there are provided, on the periphery of said profile ring, levers joined to one another by rods, said levers carrying guide rails at their free ends and being detachably fastened to said profile ring by means of swivel joints.

2. Apparatus as claimed in claim 1, wherein said levers can be swivelled by a common drive.

* * * * *